(12) United States Patent
Keaffaber et al.

(10) Patent No.: US 9,517,424 B2
(45) Date of Patent: Dec. 13, 2016

(54) METHOD FOR REMOVING HYDROGEN PHOSPHATE FROM AN AQUEOUS SOLUTION USING ALPHA ZIRCONIUM PHOSPHATE

(75) Inventors: Jeffrey J. Keaffaber, Gainesville, FL (US); Daniel R. Talham, Gainesville, FL (US)

(73) Assignee: UNIVERSITY OF FLORIDA RESEARCH FOUNDATION, INC, Gainesville, FL (US)

( * ) Notice: Subject to any disclaimer, the term of this patent is extended or adjusted under 35 U.S.C. 154(b) by 189 days.

(21) Appl. No.: 14/004,231

(22) PCT Filed: Apr. 9, 2012

(86) PCT No.: PCT/US2012/032692
§ 371 (c)(1),
(2), (4) Date: Sep. 10, 2013

(87) PCT Pub. No.: WO2013/109297
PCT Pub. Date: Jul. 25, 2013

(65) Prior Publication Data
US 2014/0027382 A1   Jan. 30, 2014

Related U.S. Application Data

(60) Provisional application No. 61/475,353, filed on Apr. 14, 2011.

(51) Int. Cl.
*C02F 1/28* (2006.01)
*B01D 15/02* (2006.01)
(Continued)

(52) U.S. Cl.
CPC ............... *B01D 15/02* (2013.01); *B01D 15/00* (2013.01); *B01J 20/0211* (2013.01);
(Continued)

(58) Field of Classification Search
CPC .............. B01J 20/28007; B01J 20/3204; B01J 20/3208; B01J 20/3236; B01J 20/3265; B01J 20/0211; B01J 20/0292; B01J 20/103; C02F 1/281; C02F 2101/103; C02F 2101/105; C02F 2305/08; B01D 15/00; B01D 15/02
(Continued)

(56) References Cited

U.S. PATENT DOCUMENTS

| 4,025,608 A | 5/1977 | Tawil et al. |
| 4,134,831 A | 1/1979 | Dawson et al. |

(Continued)

FOREIGN PATENT DOCUMENTS

| WO | 9842626 A1 | 10/1998 |
| WO | 20070476245 A1 | 4/2007 |
| WO | 2008142584 A1 | 11/2008 |

OTHER PUBLICATIONS

Komarov, Synthesis and Sorption-Structure Properties of Zirconium Phosphate, Nov. 1996, Proceedings of the Academy of Sciences of Belarus, vol. 4, pp. 53-57.*

(Continued)

*Primary Examiner* — Matthew O Savage
(74) *Attorney, Agent, or Firm* — Thomas Horstemeyer, LLP

(57) ABSTRACT

Embodiments of the present disclosure provide metal ligand nanoparticles, particles including the metal ligand nanoparticles, filters including the metal ligand nanoparticles and/or particles, devices and systems for filtering a fluid, compositions including the metal ligand nanoparticles, and the like.

1 Claim, 21 Drawing Sheets

(51) Int. Cl.
*B01J 20/28* (2006.01)
*B01J 20/32* (2006.01)
*B01J 20/02* (2006.01)
*B01J 20/10* (2006.01)
*B01D 15/00* (2006.01)
*B82Y 30/00* (2011.01)
*C02F 101/10* (2006.01)

(52) U.S. Cl.
CPC ......... *B01J 20/0292* (2013.01); *B01J 20/103* (2013.01); *B01J 20/28007* (2013.01); *B01J 20/3204* (2013.01); *B01J 20/3208* (2013.01); *B01J 20/3236* (2013.01); *B01J 20/3265* (2013.01); *B82Y 30/00* (2013.01); *C02F 1/281* (2013.01); *C02F 2101/105* (2013.01); *C02F 2305/08* (2013.01); *Y02W 10/37* (2015.05)

(58) Field of Classification Search
USPC .................................................. 210/683, 906
See application file for complete search history.

(56) References Cited

U.S. PATENT DOCUMENTS

| | | | |
|---|---|---|---|
| 4,521,528 A | | 6/1985 | Kovach |
| 4,557,824 A | | 12/1985 | Kukes et al. |
| 4,853,130 A | * | 8/1989 | D'Angelo et al. ............ 210/663 |
| 5,234,603 A | | 8/1993 | Potts |
| 6,136,199 A | | 10/2000 | SenGupta et al. |
| 6,814,871 B1 | | 11/2004 | Bem et al. |
| 7,335,623 B2 | | 2/2008 | Seko et al. |
| 2003/0196960 A1 | | 10/2003 | Hughes |
| 2004/0007531 A1 | * | 1/2004 | Bortun .................. B01J 21/06 210/660 |
| 2004/0121676 A1 | * | 6/2004 | Seko et al. .................... 442/59 |
| 2007/0213665 A1 | | 9/2007 | Curtin et al. |
| 2008/0006581 A1 | * | 1/2008 | Zou et al. ..................... 210/656 |
| 2008/0014133 A1 | * | 1/2008 | Glagolenko et al. ......... 423/155 |
| 2009/0029167 A1 | * | 1/2009 | Sun et al. ..................... 428/402 |
| 2009/0272293 A1 | | 11/2009 | Ono |

OTHER PUBLICATIONS

Troup et al, On the Mechanism of Ion Exchange in Zirconium Phosphates, Jun. 1977, Inorganic Chemistry, vol. 16, No. 12, pp. 3311-3314.*

Zhang et al, Selective removal of phosphate in waters using a novel cation adsorbent: Zirconium phosphate (ZrP) behavior and mechanism, Feb. 2013, Chemical Engineering Journal, vol. 221, pp. 315-321.*

Ross, et al. "Zirconium Phosphate and Phosphonate Nanoparticles for Phosphate Removal from Water: An Aquarium Life Support System Application," Poster, AALSO Symposium 2010, May 2010.

Ross, et al. "Zirconium Phosphate and Phosphonate Nanoparticles for Phospate Removal from Water: An Aquarium Life Support System Application," Paper, AALSO Symposium 2010, pp. 1-4, May 2010.

Zhang, et al., "Lanthanum Chloride or Lanthanum Carboxylate for Orthophosphate Removal in Seawater Aquarium—A Feasibility Study," pp. 1-9.

Biswas, et al., "Removal and Recovery of Phosphorous From Water by Means of Adsorption Onto Orange Waste Gel Loaded with Zirconium," Bioresource Technology 99(2008), pp. 8685-8690, published Jun. 2008.

Zhu, et al., Column-Mode Phosphate Removal by a Novel Highly Selective Adsorbent, Water Research 39 (2005), pp. 2301-2308, published Jun. 2005.

International Preliminary Report on Patentability dated Oct. 24, 2013.

The International Search Report and Written Opinion dated Aug. 9, 2013.

Pan, et al., "Water Research," Apr. 12, 2007, vol. 41, pp. 3103-3111.

* cited by examiner

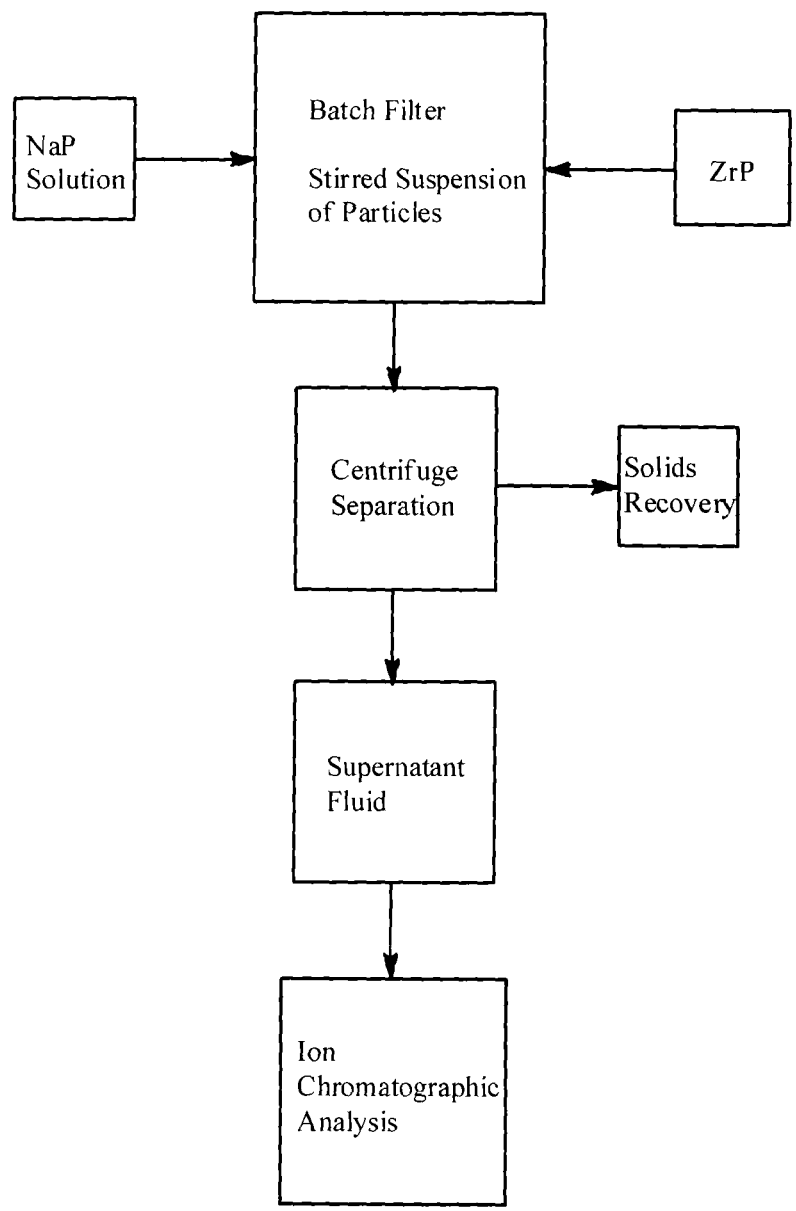
FIG. 1.1

Process Schematic
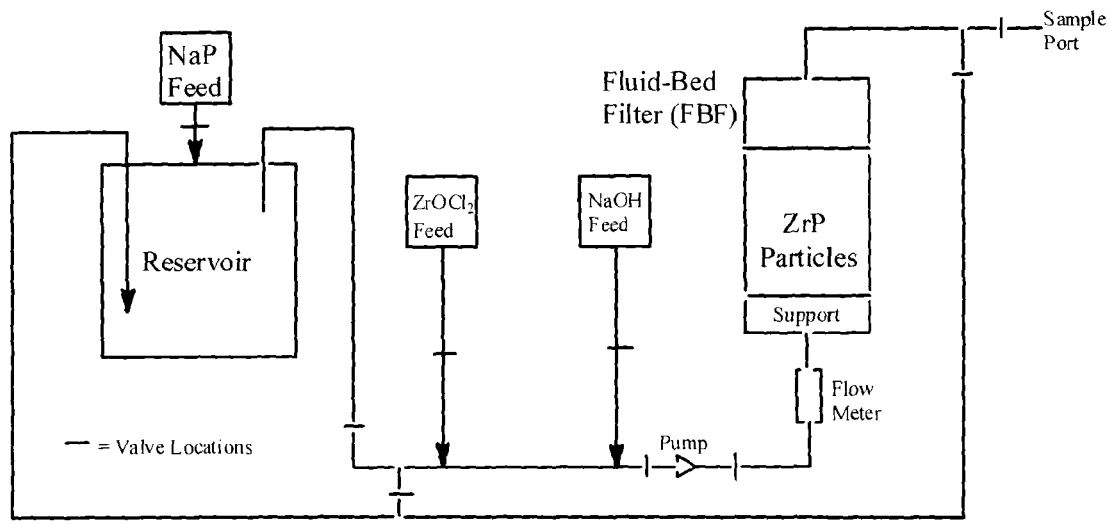
FIG. 1.2
Fluid-Bed Filter (FBF)
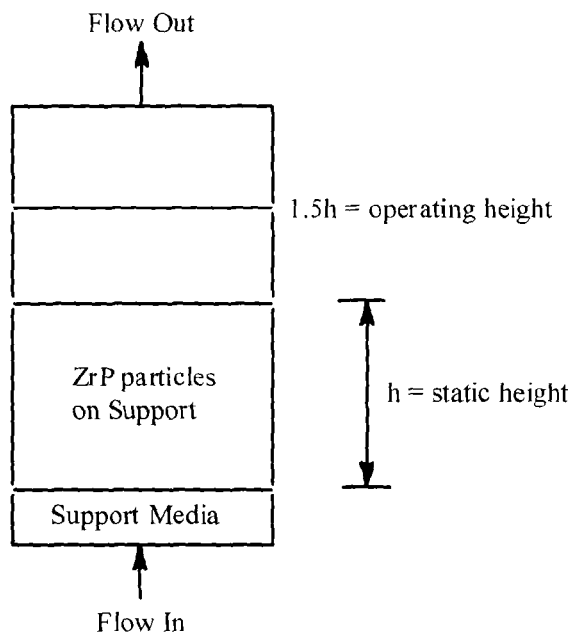
FIG. 1.3

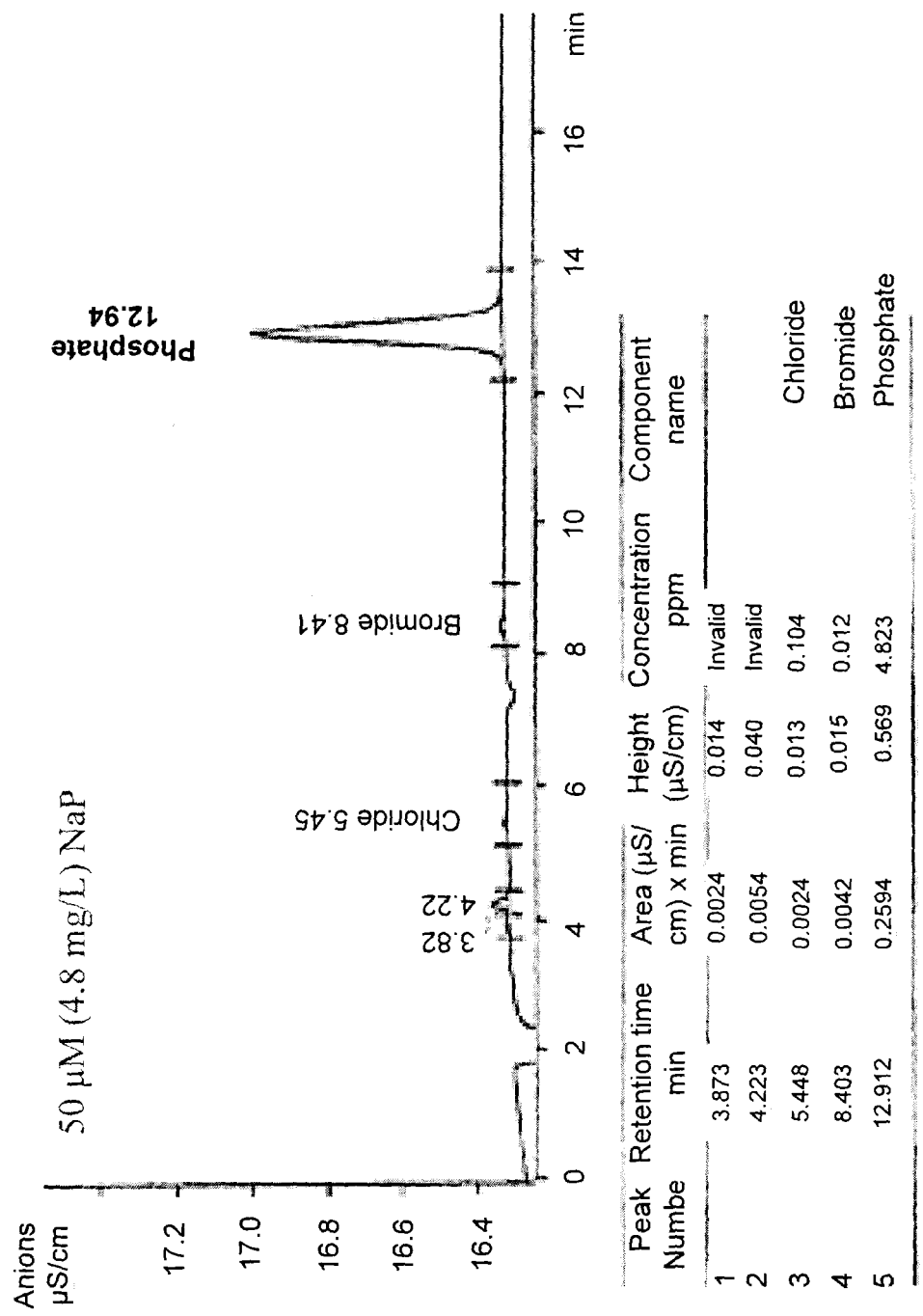
FIG. 2.1

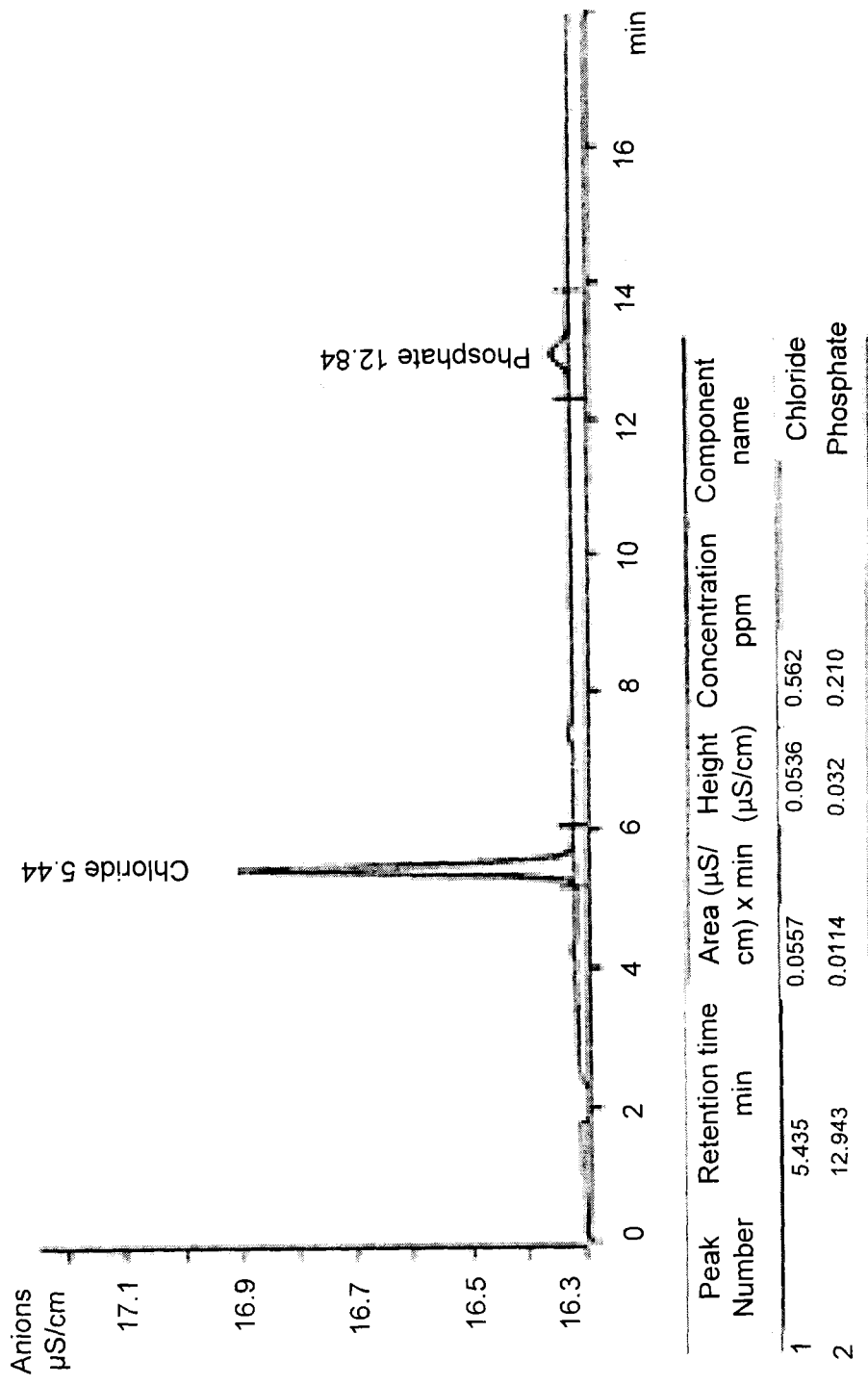
FIG. 2.2

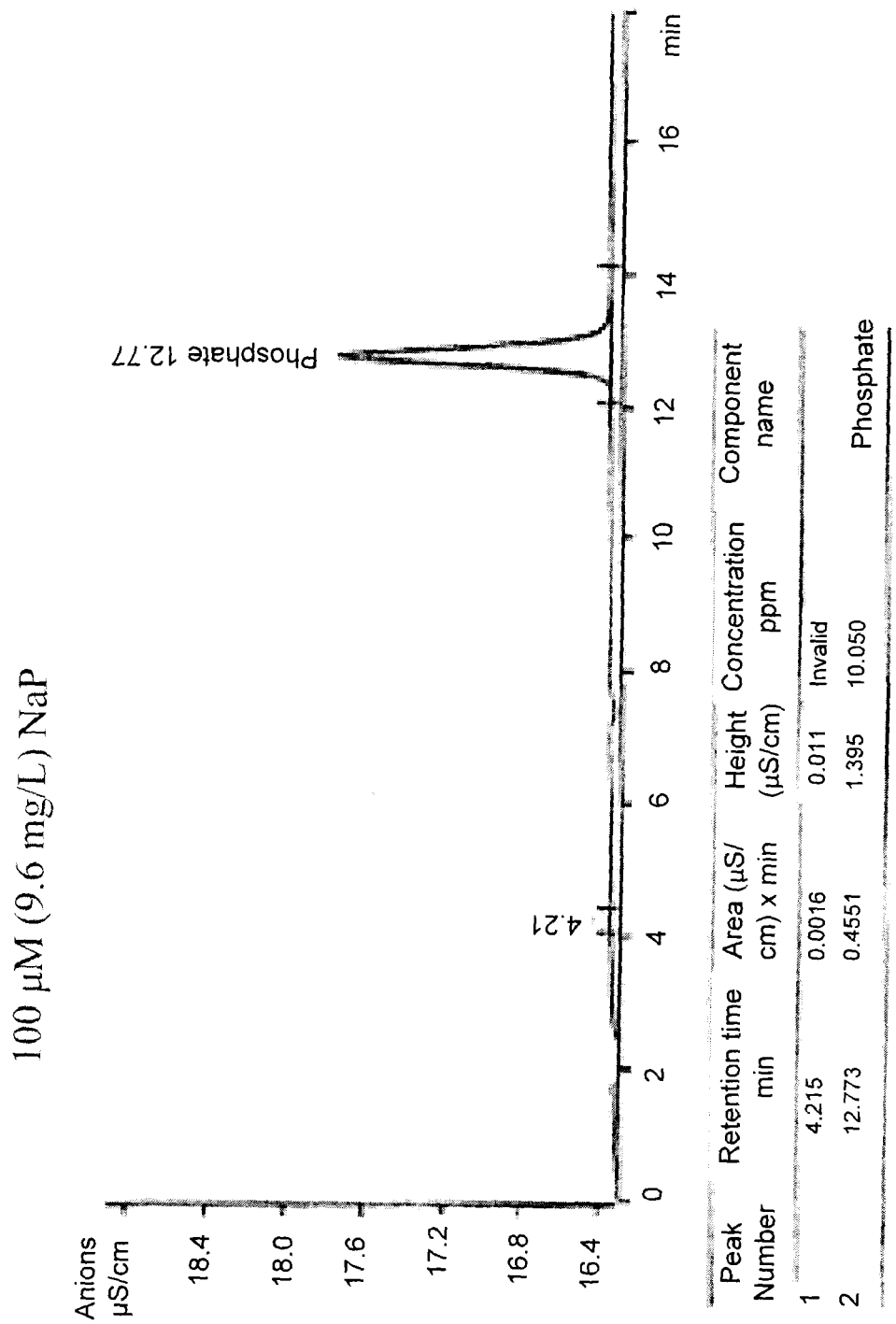
FIG. 2.3

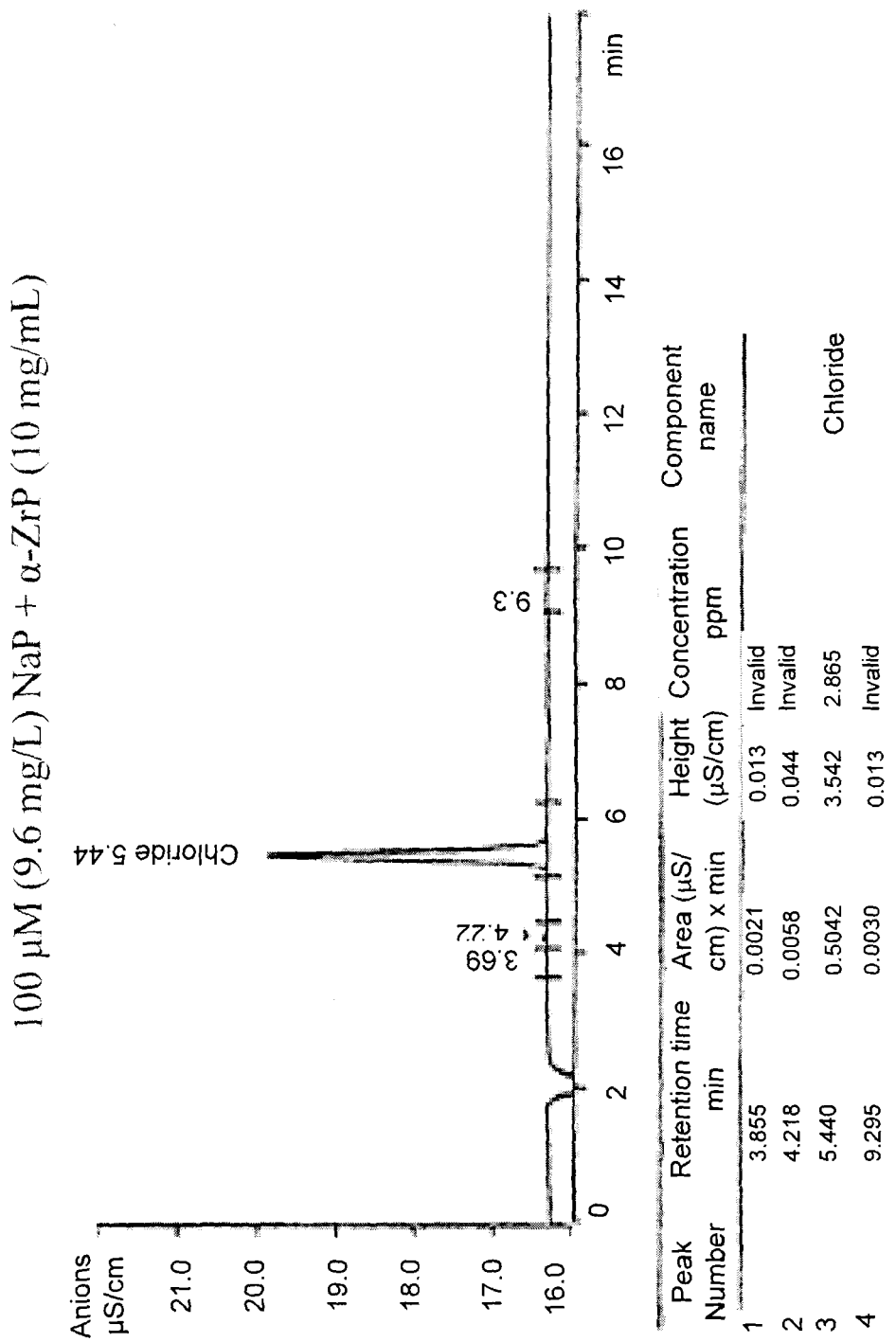
FIG. 2.4

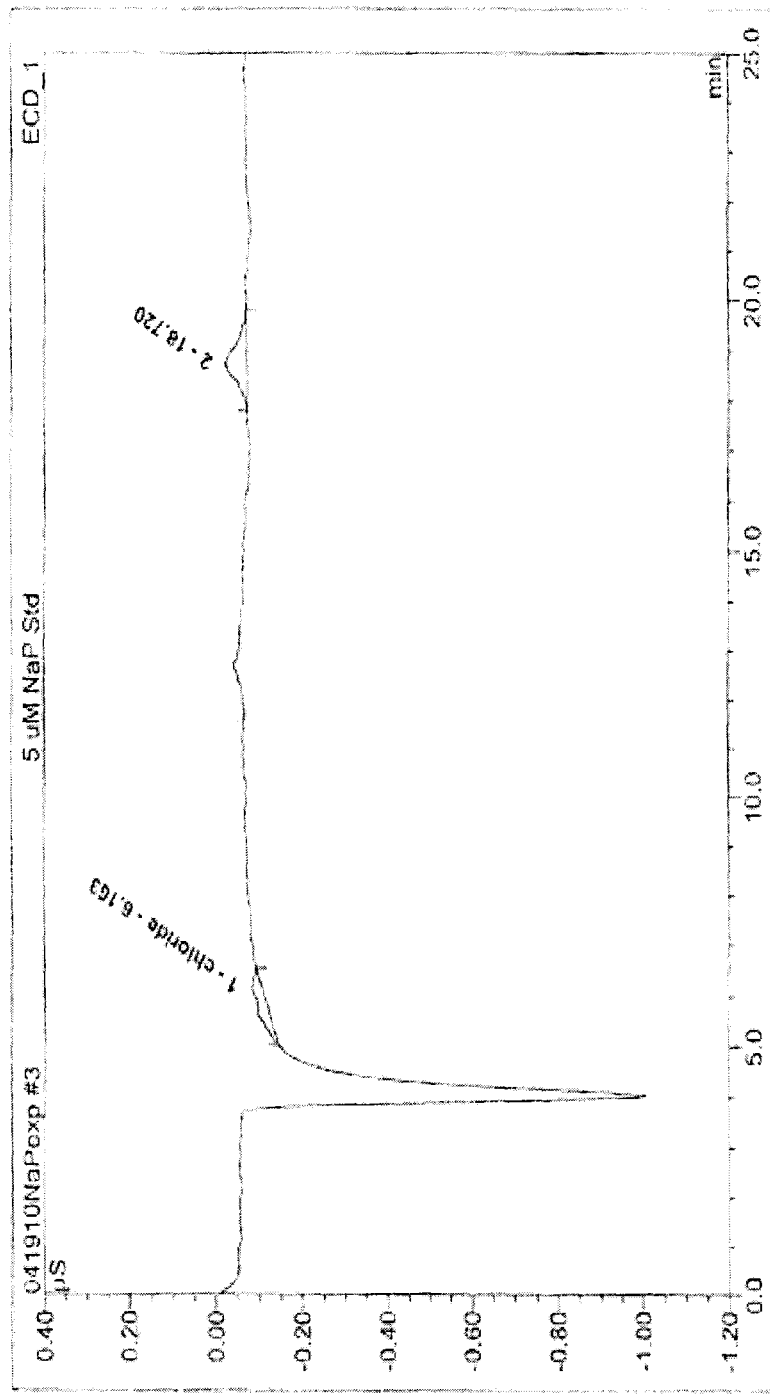
FIG. 2.5

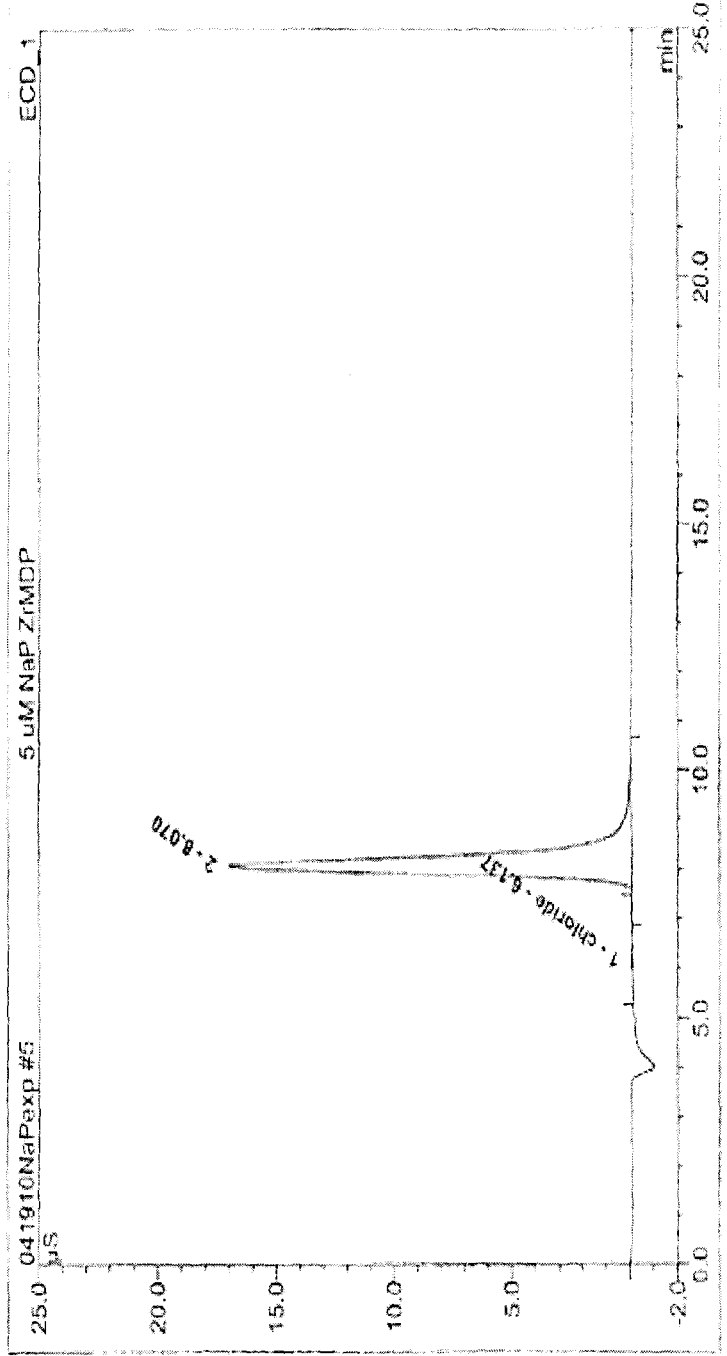
FIG. 2.6

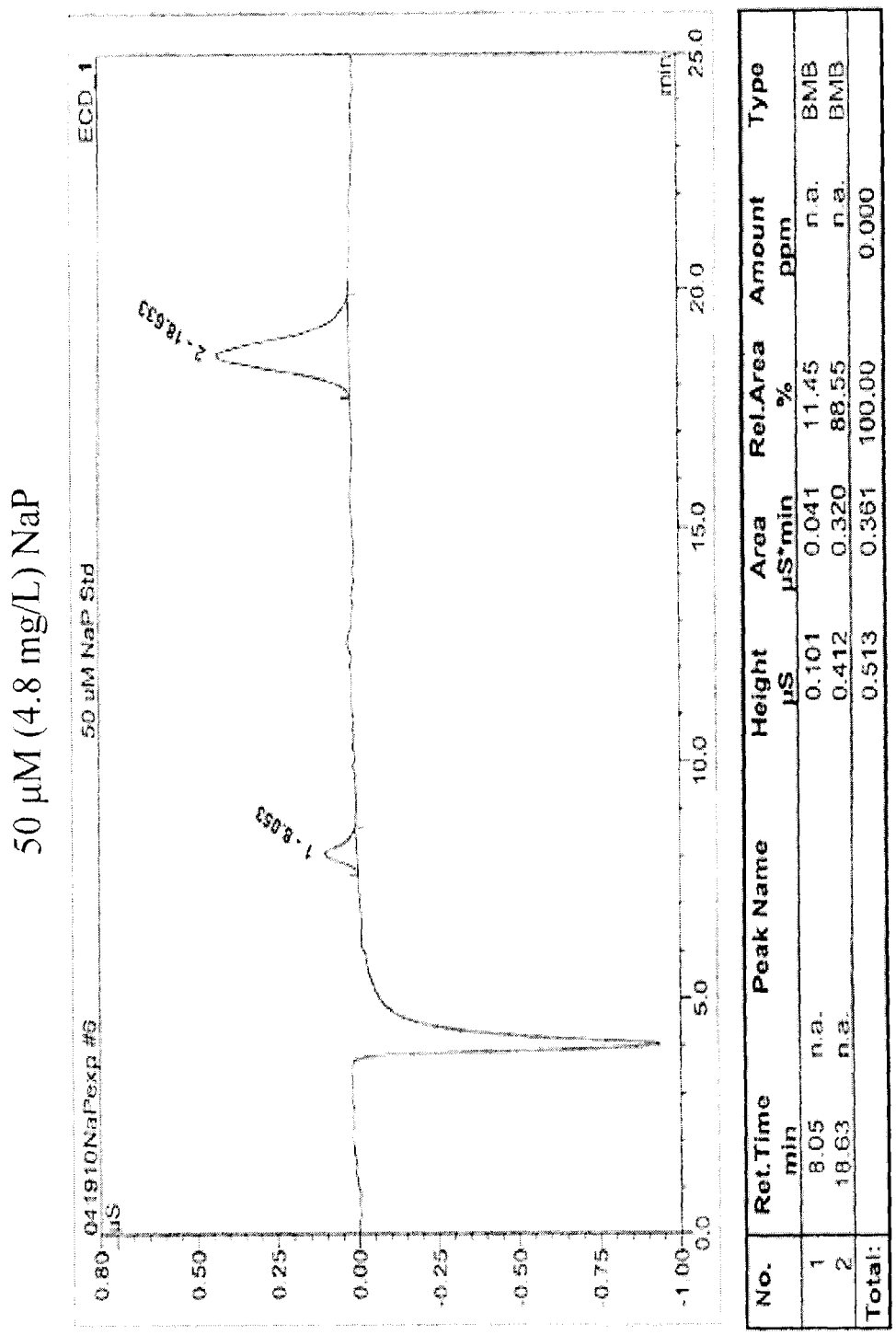
FIG. 2.7

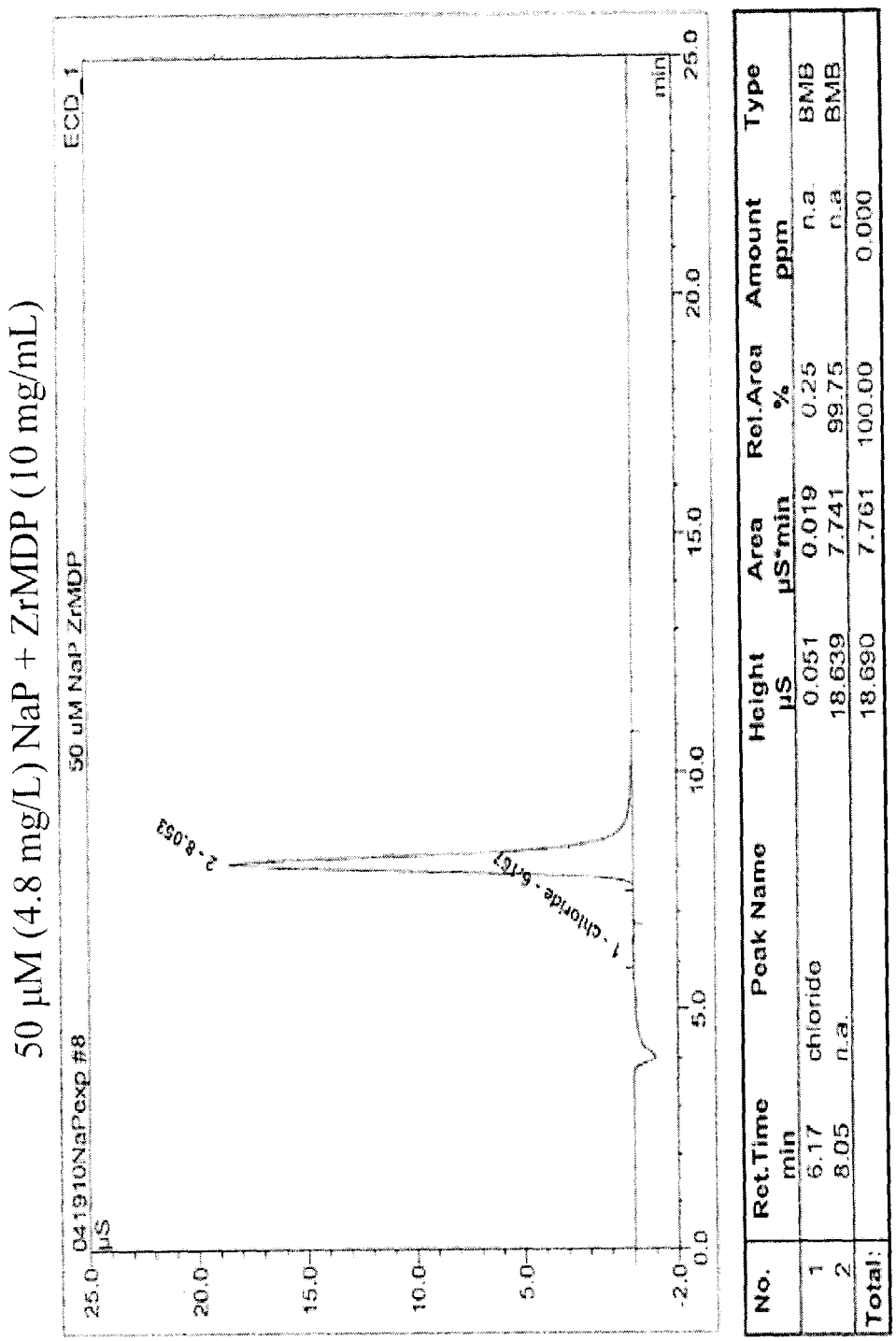
FIG. 2.8

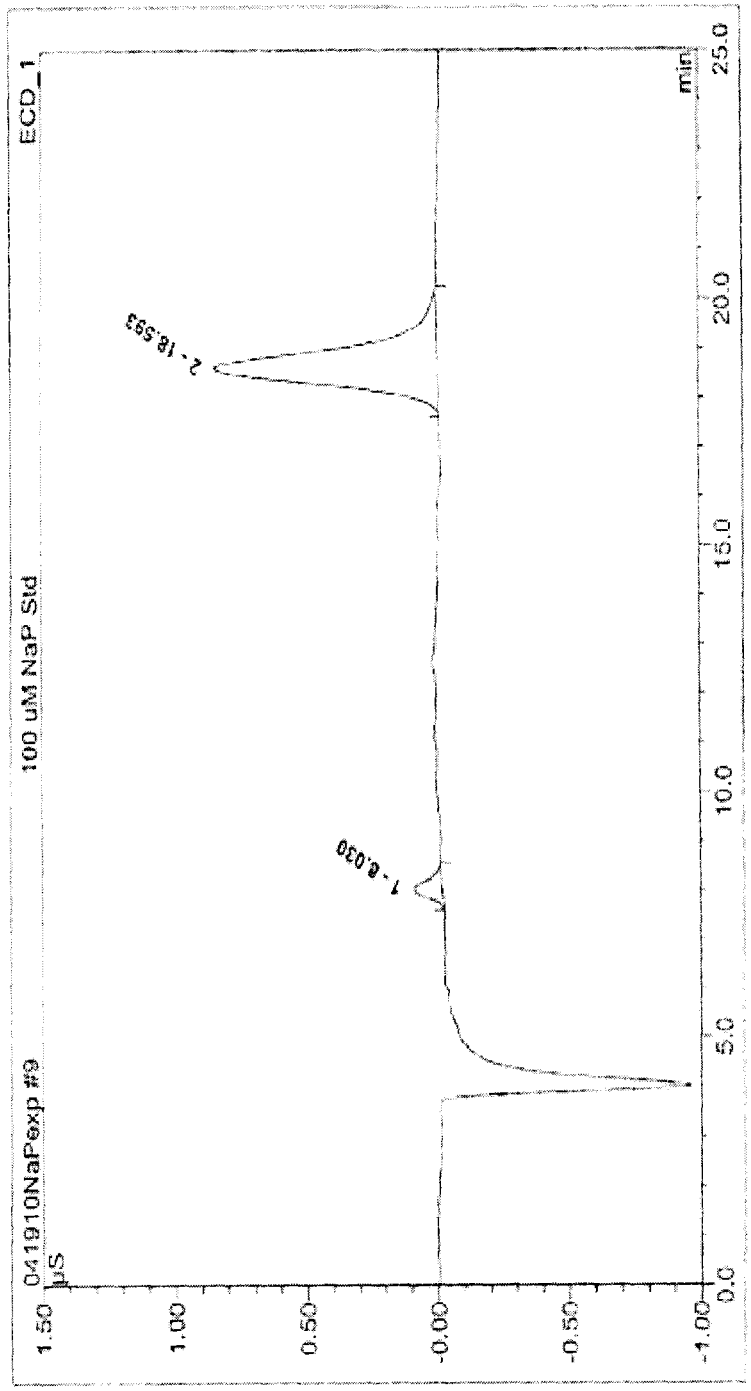
FIG. 2.9

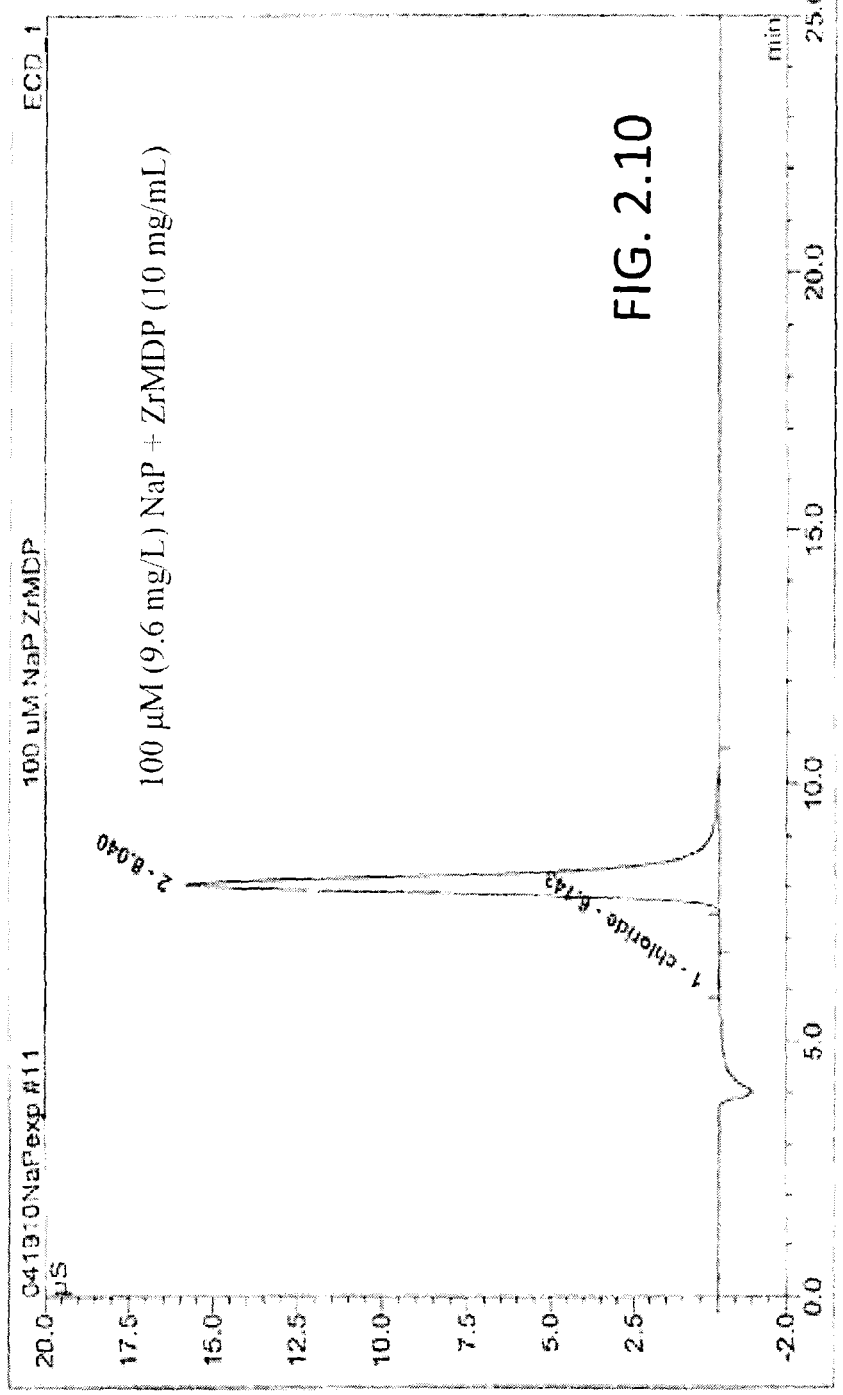
FIG. 2.10

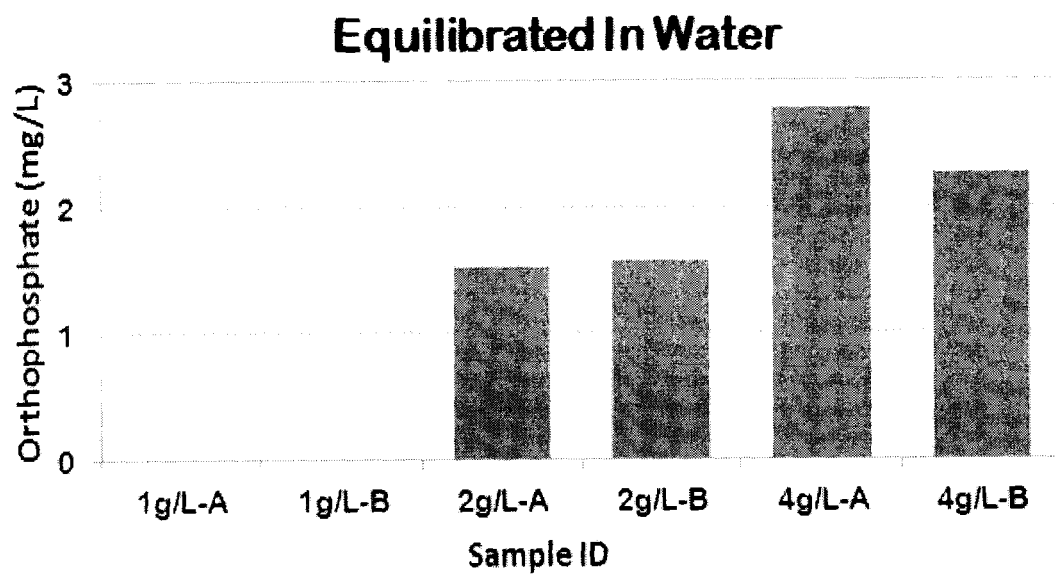
FIG. 3.1
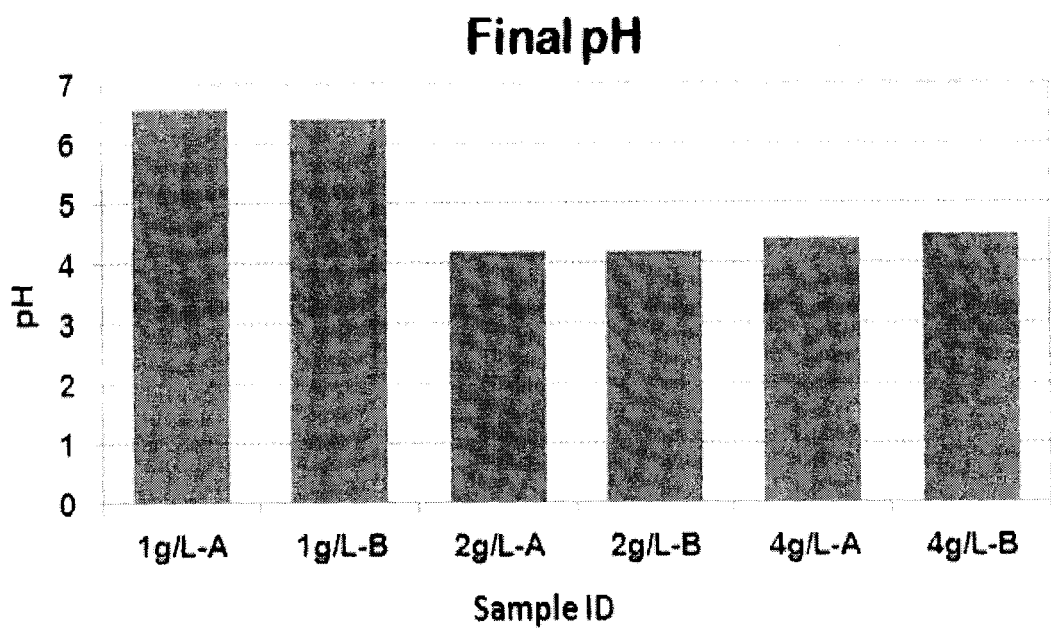
FIG. 3.2

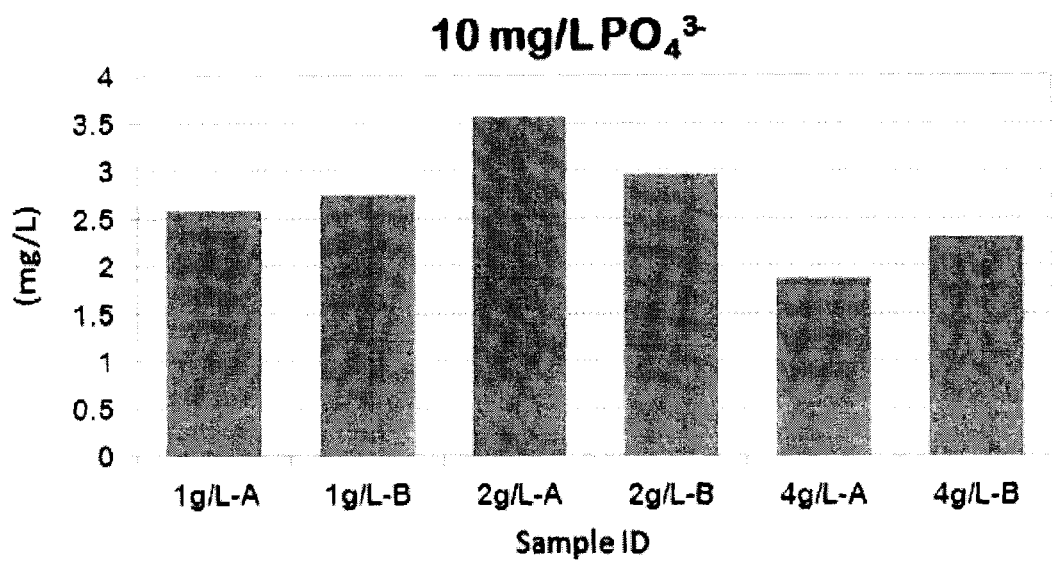
FIG. 3.3
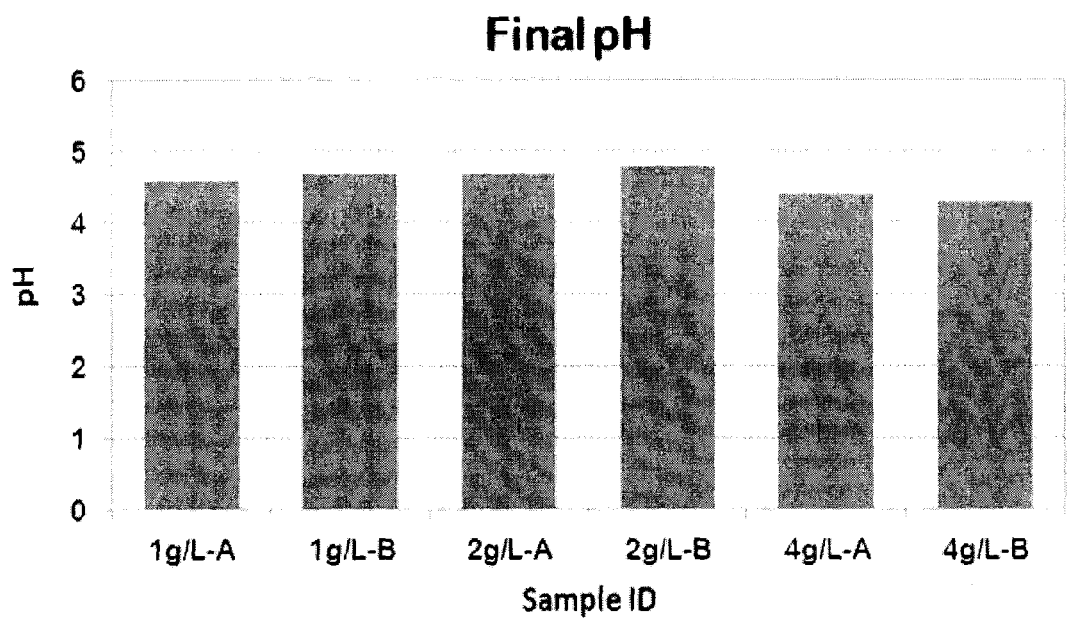
FIG. 3.4

SUMMARY

| Sample ID | 10 mg/L* Removal (mg PO$_4^{3-}$/g α-ZrP) |
|---|---|
| 1 g/L-A | 7.63 |
| 1 g/L-B | 7.50 |
| 2 g/L-A | 3.34 |
| 2 g/L-B | 3.64 |
| 4 g/L-A | 2.10 |
| 4 g/L-B | 1.99 |

FIG. 3.5

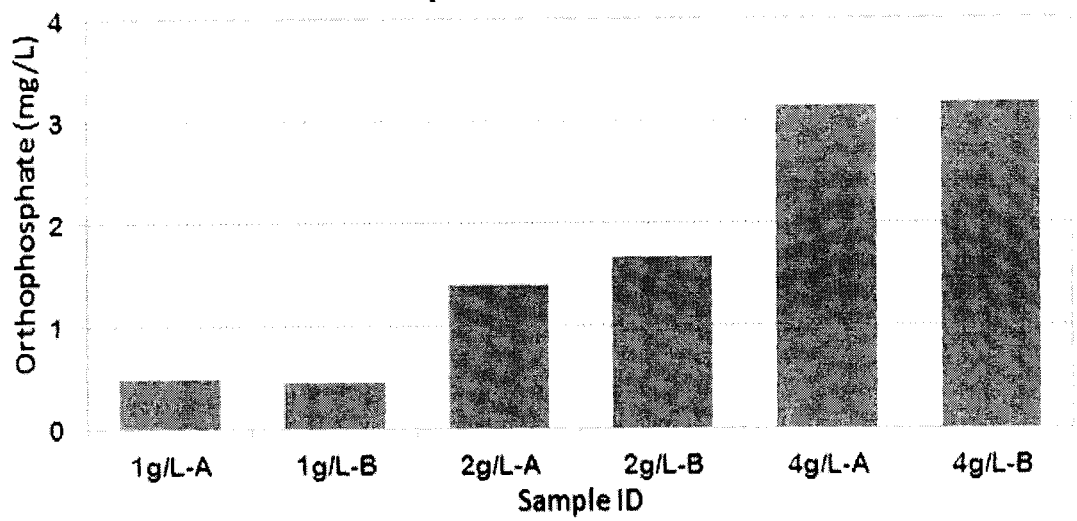
FIG. 4.1
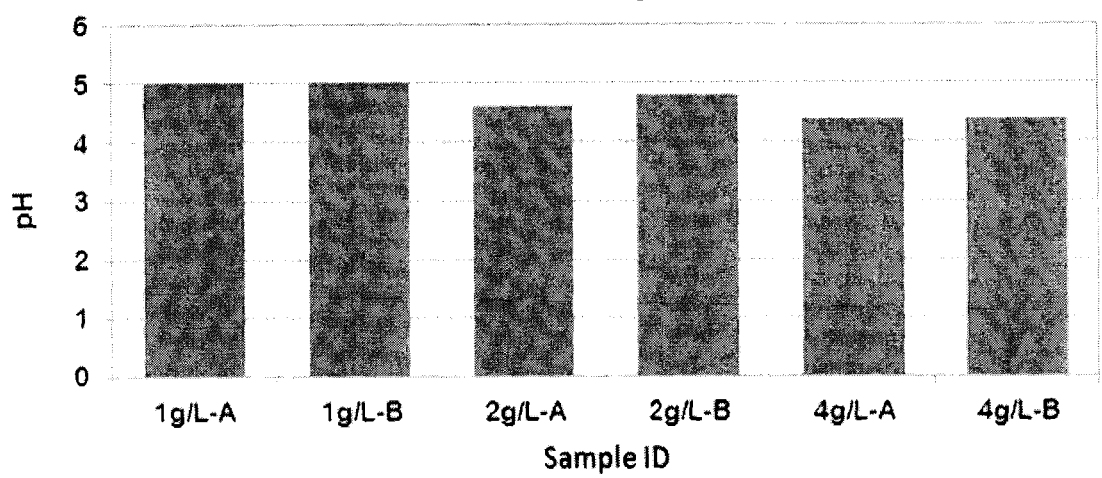
FIG. 4.2

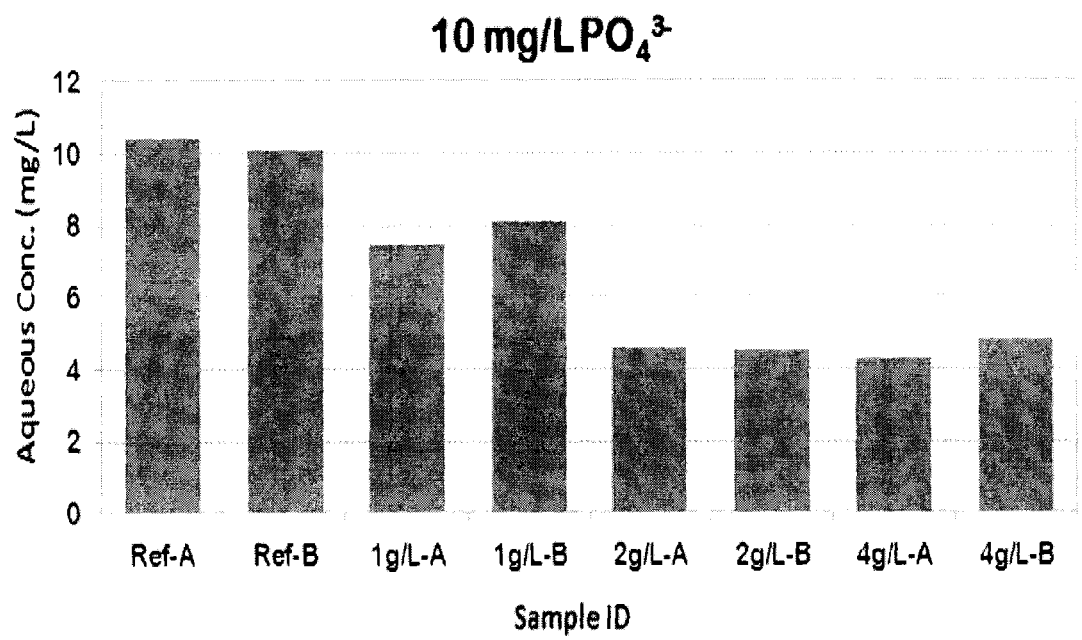
FIG. 4.3
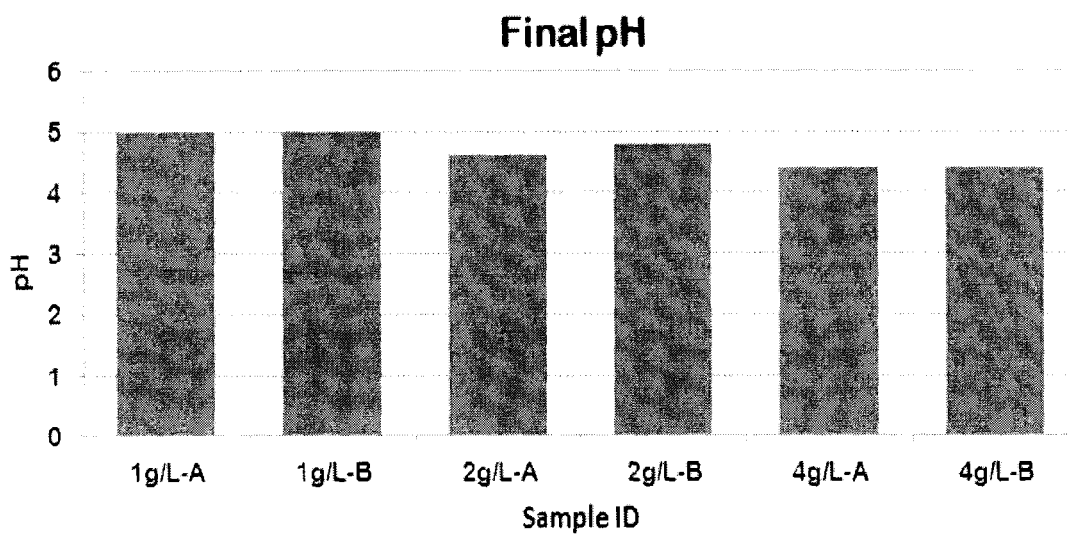
FIG. 4.4

SUMMARY

| Sample ID | 10 mg/L* Removal (mg $PO_4^{3-}$/g $\alpha$-ZrP) |
|---|---|
| 1 g/L-A | 2.75 |
| 1 g/L-B | 2.13 |
| 2 g/L-A | 2.78 |
| 2 g/L-B | 2.77 |
| 4 g/L-A | 1.47 |
| 4 g/L-B | 1.36 |

FIG. 4.5

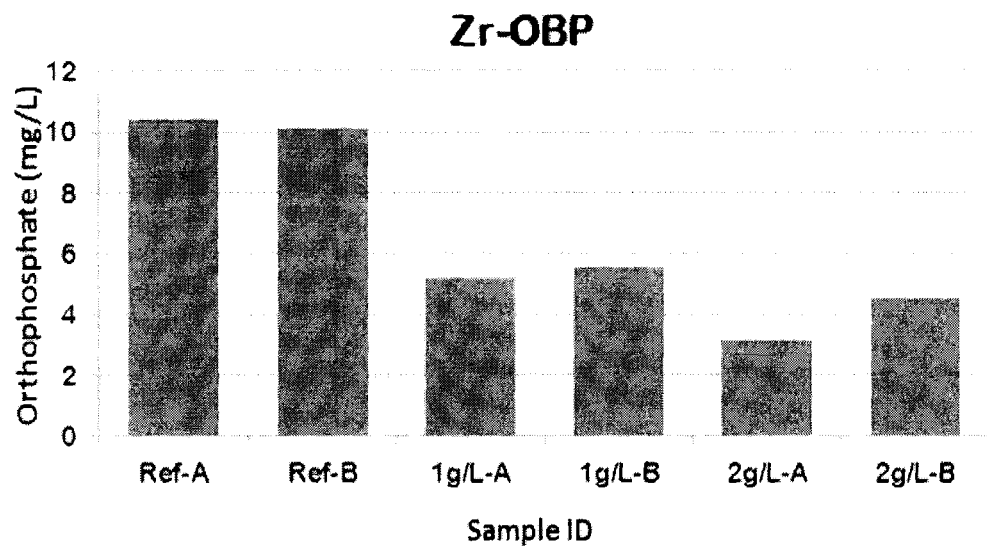
FIG. 5.1
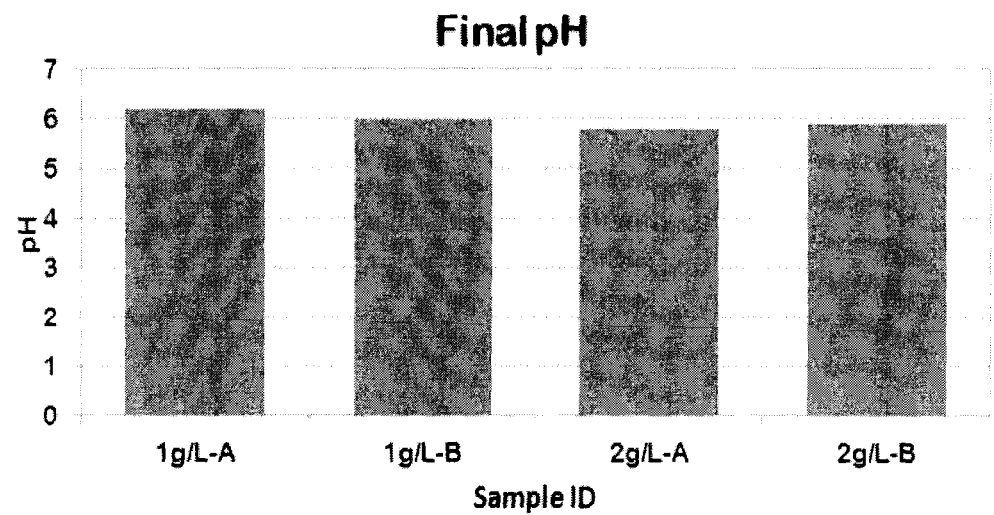
FIG. 5.2

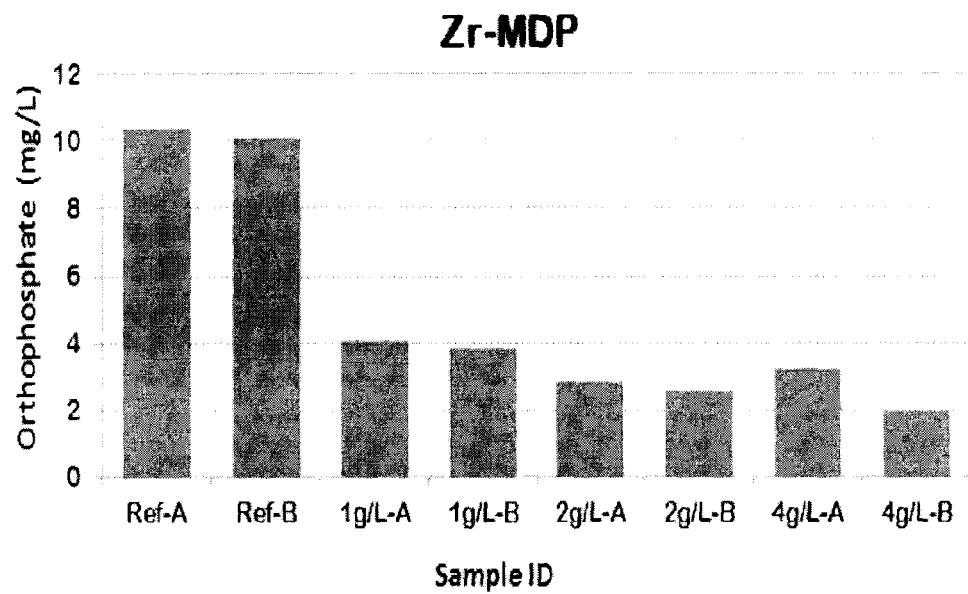
FIG. 5.3
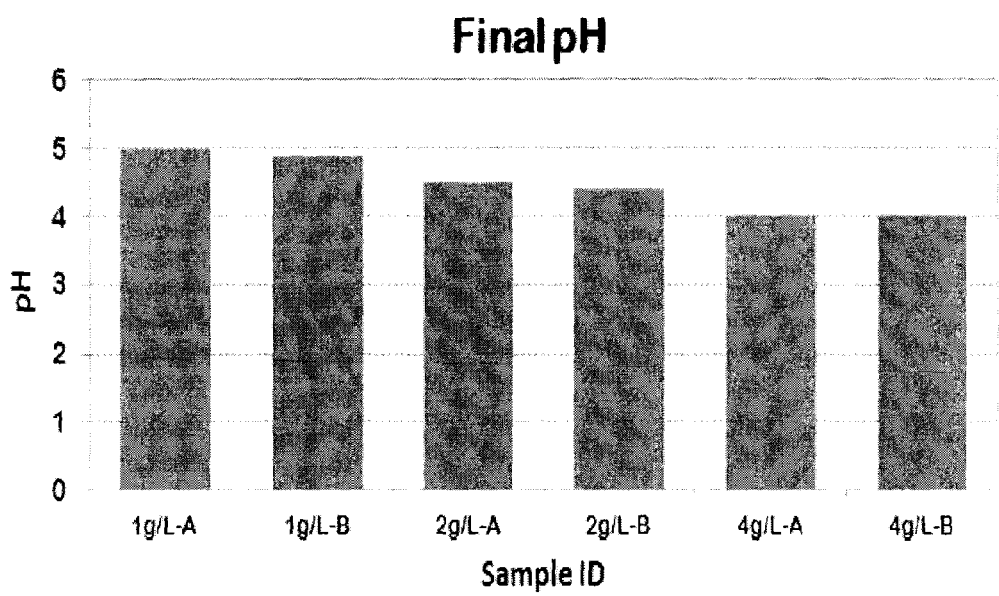
FIG. 5.4

SUMMARY

| Sample ID | 10 mg/L* Removal (mg $PO_4^{3-}$/g Zr-OBP) |
|---|---|
| 1 g/L-A | 5.03 |
| 1 g/L-B | 4.60 |
| 2 g/L-A | 3.55 |
| 2 g/L-B | 2.92 |

FIG. 5.5

| Sample ID | 10 mg/L* Removal (mg $PO_4^{3-}$/g Zr-MDP) |
|---|---|
| 1 g/L-A | 5.97 |
| 1 g/L-B | 6.18 |
| 2 g/L-A | 3.63 |
| 2 g/L-B | 3.72 |
| 4 g/L-A | 1.72 |
| 4 g/L-B | 2.07 |

FIG. 5.6

METHOD FOR REMOVING HYDROGEN PHOSPHATE FROM AN AQUEOUS SOLUTION USING ALPHA ZIRCONIUM PHOSPHATE

CROSS-REFERENCE TO RELATED APPLICATION

This application claims priority to U.S. provisional application entitled "FILTER MATERIALS, FILTERS, FILTERING SYSTEMS, AND METHODS OF FILTERING," having Ser. No. 61/475,353, filed on Apr. 14, 2011, which is entirely incorporated herein by reference.

BACKGROUND

Phosphates are common in nature. They exist as the polar hydrophilic head groups in the phospholipid bilayers of cell walls and in micelles. They are also prevalent in nucleic acids (RNA and DNA), and in the cell's "energy molecule" adenosine triphosphate (ATP). Phosphate minerals in rock like calcium hydroxyphosphate and calcium fluorophosphate are also natural sources.

In aquatic environments, phosphorus is known as the "limiting nutrient." It combines with nitrogen and photosynthetic processes to produce plant and algal growth. Phosphorus in marine life support systems exists in either a particulate or dissolved phase. While particulate sources may be removed during filtration or fractionation, the dissolved form persists.

Phosphorus is dissolved in water primarily as the phosphate ion ($PO_4^{3-}$). Natural or background concentrations of phosphate in water, also known as inorganic or orthophosphate, are in the range 0.005-0.05 mg/L. Periodic algal blooms may be observed at phosphate concentrations between 0.08-0.10 mg/L. Long term eutrophication can be avoided when phosphate levels are kept below 0.5-0.05 mg/L. In marine systems, phosphorus is the limiting nutrient when the nitrogen to phosphorus ratio is greater than 16, and this is almost always the case in aquarium life support systems. Generally, to minimize algal growth on surfaces, life support and water quality managers try to keep phosphate levels less than or equal to about 0.05 mg/L.

In aquarium life support systems, phosphates are present in particulate and dissolved forms. Particulate phosphorus may be removed during filtration, fractionation, and ozonation processes. Dissolved phosphate remains and circulates through the system. It is this form that is the limiting nutrient for algae growth. At pH 8, about 85% of dissolved phosphate is present as hydrogen phosphate ion ($HPO_4^{2-}$). The rest is dihydrogen phosphate ion ($H_2PO_4^{-}$).

Due to the prevalence of phosphates in water and the potential hazards and expense of cleaning up the results of high concentrations of phosphate, there is a need to develop methods and materials to keep the levels of phosphate at low levels.

SUMMARY

Embodiments of the present disclosure provide metal ligand nanoparticles, particles including the metal ligand nanoparticles, filters including the metal ligand nanoparticles and/or particles, devices and systems for filtering a fluid, compositions including the metal ligand nanoparticles, and the like.

An embodiment of the present disclosure includes a filter that includes: a metal ligand nanoparticle that has the characteristic of absorbing a contaminant, where the metal is selected from the group consisting of: Zr, Ti, and Hf, where the ligand is selected from the group consisting of: a phosphate, an orthophosphate, a pyrophosphate, a triphosphate, a polyphosphate, an organodiphosphate, an organodiphosphonate, an organobisphosphonate, an organobisphosphate, an organopolyphosphonate, an organopolyphosphate, and a combination thereof.

An embodiment of the present disclosure includes a structure that includes: a filter comprising a metal ligand nanoparticle that has the characteristic of absorbing a contaminant, where the metal is selected from the group consisting of: Zr, Ti, and Hf, where the ligand is selected from the group consisting of: a phosphate, an orthophosphate, a pyrophosphate, a triphosphate, a polyphosphate, an organodiphosphate, an organodiphosphonate, an organobisphosphonate, an organobisphosphate, an organopolyphosphonate, an organopolyphosphate, and a combination thereof; and a device including the filter. In an embodiment the device is selected from the group consisting of: a down flow filtering device, a static filtering device, a fixed-media filtering device, an up flow filtering device, a fluidized-bed filtering device, a plug-flow batch filtering device, an agitated batch filtering device, a continuous stirred tank filtering device, a centrifugation filtering device, and a combination thereof.

An embodiment of the present disclosure includes a method of removing a contaminant from a fluid that includes: exposing the fluid to a filter, wherein the fluid includes the contaminant, wherein the filter comprises a metal ligand nanoparticle that has the characteristic of absorbing a contaminant, wherein the metal is selected from the group consisting of: Zr, Ti, and Hf, wherein the ligand is selected from the group consisting of: a phosphate, an orthophosphate, a pyrophosphate, a triphosphate, a polyphosphate, an organodiphosphate, an organodiphosphonate, an organobisphosphonate, an organobisphosphate, an organopolyphosphonate, an organopolyphosphate, and a combination thereof; and removing the contaminant when the contaminant in the fluid contacts the metal ligand nanoparticle in the filter.

An embodiment of the present disclosure includes a composition that includes: a metal ligand nanoparticle that has the characteristic of absorbing a contaminant, wherein the metal is selected from the group consisting of: Zr, Ti, and Hf, wherein the ligand is selected from the group consisting of: a phosphate, an orthophosphate, a pyrophosphate, a triphosphate, a polyphosphate, an organodiphosphate, an organodiphosphonate, an organobisphosphonate, an organobisphosphate, an organopolyphosphonate, an organopolyphosphate, and a combination thereof.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 1.1 illustrates schematics of an embodiment of a batch filter process flow model that includes metal ligand nanoparticles.

FIG. 1.2 illustrates an embodiment of a process schematic of a fluid-bed filter system.

FIG. 1.3 illustrates a schematic of an embodiment of a fluid-bed filter that includes zirconium polyphosphate nanoparticles.

FIGS. 2.1 to 2.10 are graphs illustrating ion chromatographs measuring phosphate concentrations in aqueous solutions.

FIGS. 3.1 to 3.4 are graphs illustrating the removal of $PO_4^{3-}$ using α-ZrP, while FIG. 3.5 is a table summarizing the results.

FIGS. 4.1 to 4.4 are graphs illustrating the removal of $PO_4^{3-}$ using α-ZrP, while FIG. 4.5 is a table summarizing the results.

FIGS. 5.1 to 5.4 are graphs illustrating the removal of $PO_4^{3-}$ from a 10 mg/L $PO_4^{3-}$ using Zr-OBP (EP-148) and Zr-MDP (EP-144), while FIGS. 5.5 and 5.6 is a table summarizing the removal (uptake) results for EP-148 and EP-144, respectively.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims. Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed. Terms defined in references that are incorporated by reference do not alter definitions of terms defined in the present disclosure or should such terms be used to define terms in the present disclosure they should only be used in a manner that is inconsistent with the present disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure provide metal ligand nanoparticles, particles including (e.g., attached to) the metal ligand nanoparticles, filters including the metal ligand nanoparticles and/or particles, devices and systems for filtering a fluid, compositions including the metal ligand nanoparticles, and the like. An embodiment of the present disclosure is advantageous in that contaminant(s) (e.g., phosphate) can be removed from a fluid in very high yields. In an embodiment, once the material used to collect the contaminant(s) is saturated with the contaminant, the material can be reclaimed and recycled.

An embodiment of the present disclosure includes a metal ligand nanoparticle that has the characteristic of absorbing one or more contaminants upon interaction (e.g., contact with) with the contaminant in a fluid (e.g., dissolved phosphate in water). In an embodiment, the metal can be selected from zirconium (Zr), titanium (Ti), and halfnium (Hf). In a particular embodiment, the metal can be Zr.

In an embodiment, the ligand can include a phosphate, an orthophosphate, a pyrophosphate, a triphosphate, a polyphosphate, an organodiphosphate, an organodiphosphonate, an organobisphosphonate, an organobisphosphate, an organopolyphosphonate, an organopolyphosphate, or a combination thereof. In an embodiment, the polyphosphate can include $P_2O_7^{4-}$, $P_3O_{10}^{5-}$, and/or their different acid forms. In an embodiment, the organodiphosphonate can be represented by the formula: $(O_3P-R-PO_3)^{4-}$, where $R=CH_2$, $C_2H_4$, $C_3H_6$, $C_6H_4$, and the like. In an embodiment, the organodiphosphate can be represented by the formula: $(O_3PO-R-OPO_3)^{4-}$, where $R=CH_2$, $C_2H_4$, $C_3H_6$, $C_6H_4$, and the like.

In an embodiment, the metal ligand nanoparticle can include the same or different types of ligands, such as those described herein, on the same metal ion. The following is an example of a zirconium multi-ligand nanoparticle having two types of ligands: $Zr(HPO_4)_{2-2x}(O_3P-R-PO_3)_x$, with $R=CH_2$, $C_2H_4$, $C_3H_6$, $C_6H_4$ and x is about 0 to 1.

In an embodiment, one or more of the metal ligand nanoparticles can be attached (e.g., directly or indirectly) to a particle. In an embodiment, the particle acts as a scaffold or support for the metal ligand nanoparticles so that they are not easily swept away in the fluid or so that other means are needed to contain the metal ligand nanoparticles. In an embodiment, the metal ligand nanoparticles can be attached to the particle via a covalent bond, a non-covalent bond, an ionic bond, a chelated bond, as well as being attached through interactions such as, but not limited to, hydrophobic interactions, hydrophilic interactions, charge-charge interactions, π-stacking interactions, combinations thereof, and like interactions. In an embodiment, the particles can include a silica particle, a polymer particle, cationic ionomers, and anionic ionomers. In an embodiment, the polymer particle can be made out of material such as polystyrene, latex, polyethylene, poly(methyl methacrylate), poly(acrylic acid), nylon, poly(lactic acid), PLGA, chitosan, and a combination thereof. In an embodiment, the particle can have a diameter of hundreds of nanometers to millimeters, to centimeters, or larger. In an embodiment, the particle can be porous so that the surface area is large so that more metal ligand nanoparticles can be attached on the surface and in the pores of the particle.

In an embodiment, the metal ligand nanoparticle can include alpha-zirconium phosphate ($\alpha$-ZrP, $Zr(O_3POH)_2-H_2O$), zirconium methylenediphosphonate (ZrMDP, $Zr[O_3P(CH_2)PO_3]$), or zirconium octylenebisphosphonate (ZrOBP or $Zr[O_3P(CH_2)_8PO_3]$), each of which can remove phosphate removal from water. As described in more detail in the Example, sodium phosphate solutions (0.5-10.0 mg/L) are exposed to nanoparticle suspensions (10 mg/mL) and phosphate uptake is measured by ion chromatography or the ascorbic acid method. In each case, high phosphate removal is observed.

For example, the 5.00 mg/L sodium phosphate solution experiences about 99.9% removal after exposure to $\alpha$-ZrP. After treatment of the fluid, the phosphate concentration drops to 0.005 mg/L. This is well below the algal growth threshold (0.01-0.05 mg/L).

In an embodiment, the metal ligand nanoparticle (e.g., individually or on a particle) can be included in a filter. In an embodiment, the filter can be used in a filtering device such as a down flow filtering device, a static filtering device, a fixed-media filtering device, an up flow filtering device, a fluidized-bed filtering device, a plug-flow batch filtering device, an agitated batch filtering device, a continuous stirred tank filtering device, and a centrifugation filtering device, for removing contaminants from a fluid. The type of filter can vary depending on the type of device used. For example, the example below describes a fluidized bed filter. The metal ligand nanoparticles can be used in addition to the materials or to replace the materials used in the normal filters used in these devices. In some instances an additional structure or layer of material can be used (e.g., on top and/or bottom of or in front and/or back of the metal ligand materials) to ensure that the metal ligand nanoparticles do not flow away with the fluid flowing through the filter.

In an embodiment, the conventional down-flow pressure sand or other media filters can include the nanoparticles alone or on support can serve as the actual media or are combined with sand, diatomaceous earth, or other filter membranes.

In an embodiment, the contaminant can include one more types of contaminant such as: phosphate and pentavalent group 15 oxoanions. In an embodiment, the pentavalent group 15 oxoanion can include arsenate, which is similar to phosphate.

In an embodiment, the fluid can derive from a source, device, or system such as those used in eutrophication abatement and algae control, industrial waste streams, and the like. In this regard, the filter or the device including the filter can be used to remove one or more types of contaminants from fluids used in these. For eutrophication abatement and algae control, the fluid can be derived from decorative water features, fountains, and pools, municipal and home swimming pools, hot tubs/spas; golf course ponds; marine and freshwater aquaria, aquatic zoo exhibits, and aquaculture facilities; municipal storm water, drinking water, and wastewater treatment; urban creeks and stream discharge; utility electric power plants and cooling towers; lake, stream, wetland, estuarine, and localized coastal restoration (e.g., red tide control). For industrial waste streams, the fluid can be derived from agricultural runoff including citrus and sugar cane industries; poultry, beef, and swine production; consumer product industries including brewery, detergent, soap, and cosmetic waste streams; pulp and paper mills; fertilizer production facilities and the phosphate/phosphoric acid industries; petrochemical and pharmaceutical manufacturing; ethanol refining; soft drink, juice, and bottled water manufacturing; and other industries that require NPDES (National Pollution Discharge Elimination System) compliance.

In general, the contaminant(s) (e.g., phosphate) can be removed from a fluid such as water in an aquarium by exposing the fluid to the metal ligand nanoparticles. The metal ligand nanoparticles can be used individually and/or disposed on particles. The metal ligand nanoparticles absorb the contaminant as the fluid contacts the metal ligand nanoparticles. The metal ligand nanoparticles can be used in a filter in a device the circulates the fluid through the filter to remove particles and remove dissolved contaminant such as phosphate using the metal ligand nanoparticles. After a time period, the metal ligand nanoparticles in the filter can be replaced and the used metal ligand nanoparticles can be reclaimed or recycled.

In an embodiment, FIG. 1.1 illustrates schematics of an embodiment of a batch filter process flow model that includes metal ligand nanoparticles FIG. 1.2 illustrates an embodiment of a process schematic of a fluid-bed filter system, while FIG. 1.3 illustrates a schematic of an embodiment of a fluid-bed filter that includes zirconium polyphosphate nanoparticles.

EXAMPLES

Now having described the embodiments of the disclosure, in general, the example describes some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

In aquatic environments, phosphorus is known as the "limiting nutrient." It combines with nitrogen and photosynthetic processes to produce plant and algal growth. Phosphorus in marine life support systems exists in either a particulate or dissolved phase. While particulate sources may be removed during filtration or fractionation, the dissolved form persists. In a typical marine environment (pH 8), dissolved phosphorus is almost all hydrogen phosphate ion ($HOPO_3^{2-}$), also known as inorganic or orthophosphate. In this example, we report the synthesis and use of zirconium phosphate (α-ZrP, $Zr(O_3POH)_2.H_2O$) and zirconium methylenediphosphonate (ZrMDP, $Zr[O_3P(CH_2)PO_3]$) nanoparticles for phosphate removal from water. Sodium phosphate solutions (0.5-10.0 mg/L) are exposed to nanoparticle suspensions (10 mg/mL) and phosphate uptake is measured by ion chromatography. In all cases, high phosphate removal is observed. For example, the 5.00 mg/L sodium phosphate solution experiences 99.9% removal after exposure to α-ZrP. After treatment the phosphate concentration drops to 0.005 mg/L. This concentration is well below the algal growth threshold (0.01-0.05 mg/L).

Several groups have studied the structure and morphology of α-ZrP (zirconium phosphate) nanoparticles. They have been synthesized under different conditions to yield particles with varied structure and properties (Sun, et. al., 2007). Gels of zirconium phosphate have been prepared in organic solvents for their use in the preparation of polymer-based nanocomposites (Casciola, et. al., 2005). Glass composite membranes have been impregnated with α-ZrP for use in direct methanol fuel cell applications (Vaivars, et. al., 2004). Intercalation studies where small organic molecules were placed in between individual layers of α-ZrP have also been performed (Wang, et. al., 2006 and Capkova, et. al., 1998).

Two zirconium (IV) nanoparticle materials were synthesized: α-ZrP and ZrMDP. The α-ZrP system, or zirconium phosphate $[Zr(O_3POH)_2.H_2O]$, was synthesized using zirconyl chloride ($ZrOCl_2$) and phosphoric acid ($H_3PO_4$) from known methods (Sun, et. al., 2007). The ZrMDP system was synthesized by adding $ZOCl_2$ to methylene diphosphonate $[CH_2(PO_3H_2)_2]$ (Williams, 2009).

Two sets of three sodium phosphate monobasic ($NaH_2PO_4.H_2O$ or NaP) solutions were made. The phosphate concentrations were 5.0 μM (0.48 mg/L), 50 μM (4.8 mg/L), and 100 μM (9.6 mg/L). To each set of solutions, 10 mg/mL α-ZrP and ZrMDP was added. The suspensions were stirred for 48 hours, centrifuged, and the supernatant solution was submitted for ion chromatographic analysis (IC). In all cases, except one, the phosphate uptake by the particles was quantitative (100%), an encouraging result. In one solution (4.8 mg/L treated with α-ZrP), approximately 0.005 mg/L phosphate remained by IC integration (FIG. 2.2).

FIGS. 2.1 and 2.2 show this result. FIG. 2.1 is an ion chromatograph of the 50 μM (4.8 mg/L) solution of NaP before exposure to the particles. FIG. 2.2 is an ion chromatograph after exposure to a 10 mg/mL suspension of the α-ZrP particles.

The concentration of NaP was increased to 100 μM (9.6 mg/L), and this solution was exposed to a 10 mg/mL suspension of the α-ZrP particles. The ion chromatographs shown in FIGS. 2.3 and 2.4 show the results before and after exposure. FIG. 2.4 shows quantitative uptake of phosphate by the particles.

The concentration of NaP was decreased to 5.0 μM (0.48 mg/L). FIG. 2.5 shows this NaP solution with the phosphate peak eluting at nearly 19 min. After exposure to a 10 mg/mL suspension of the Zr-MDP particles, FIG. 2.6 shows no phosphate peak at 19 min., only an earlier eluting impurity.

FIG. 2.7 shows another 50 μM (4.8 mg/L) NaP standard. After exposure to a 10 mg/mL suspension of the Zr-MDP particles, FIG. 2.8 shows quantitative uptake by the particles. No phosphate peak was detected at 19 min.

FIG. 2.9 shows a 100 μM (9.6 mg/L) NaP standard. After exposure to a 10 mg/mL suspension of the Zr-MDP particles. FIG. 2.10 shows quantitative uptake by the particles. No phosphate peak was detected at 19 min.

CONCLUSION

The nanoparticle systems studied here remove all phosphate over a wide range of NaP concentrations. Any phosphate that remains is below IC detection limits.

References, each of which is incorporated herein by reference

Dunne, T. and Leopold, L. B. 1978. *Water in Environmental Planning*, W.H. Freeman and Company. New York.

Sun, L., Woong, J. B., Sue, H-J., and Clearfield, A. 2007. "Preparation of α-Zirconium Phosphate Nanoplatelets with Wide Variation in Aspect Ratios," New Journal of Chemistry 31: 39-43.

Casciola, M., Alberti, G., Donnadio, A., Pica, M., Marmottini, F., Bottino, A., and Piaggio, P. 2005. "Gels of Zirconium Phosphate in Organic Solvents and Their Use for the Preparation of Polymeric Nanocomposites," Journal of Materials Chemistry 15: 4262-4267.

Vaivars, G., Maxakato, N. W., Mokrani, T., Petrik, L., Klavins, J., Gericke, G., and Linkov, V. 2004. "Zirconium Phosphate Based Inorganic Direct Methanol Fuel Cell," Materials Science 10: 162-165.

Wang, N., Lin, H., Jianbao, L., and Li, X. 2006. "Improved Quasi-solid Dye-sensitized Solar Cell by Composite Ionic Liquid Electrolyte Including Layered α-Zirconium Phosphate," Applied Physics Letters 89: 19104.

Capkova, P., Benes, L., Melanova, K., and Schenk H. 1998. "Structure Analysis of Intercalated Zirconium Phosphate Using Molecular Simulation," Journal of Applied Crystallography 31: 845-850.

Williams, M. 2009. Ph.D. Dissertation, University of Florida

Example 2

Orthophosphate ($PO_4^{3-}$) Removal Using α-ZrP

In this Example we compare phosphate uptake (mg/g) of 2 & 4 g/L α-ZrP (EP-113) suspension in 10 mg/L $PO_4^{3-}$ solution without pH adjustment and measure stability of 2 & 4 g/L α-ZrP suspension in DI $H_2O$.

The α-ZrP (Zr:P ratio=1) was prepared by modifying the reflux method according to Sun et al. (2007). Briefly, 2 grams of $ZrOCl_2.8H_2O$ was refluxed with 20 mL 1.0 M $H_3PO_4$ in a pyrex glass flask at 100° C. for 24 hrs. The gel product was then thoroughly washed with DI water and dried at 60° C. for 24 hrs.

Post-treatment was performed by separately re-suspending dried α-ZrP in 0.1 M $ZrOCl_2.8H_2O$. An 24-hr equilibration time was arbitrarily selected with continuous agitation. The post-treated samples were thoroughly washed with DI water to remove excess salt and dried as before. Suspensions (1 g/L) of α-ZrP were equilibrated in DI water and 10 mg/L phosphate solutions for 24 hrs. Aliquots (7 mL each) were then analyzed for phosphate.

FIGS. 3.1 to 3.4 are equilibration graphs in DI water and in 10 mg/L $PO_4^{3-}$ illustrating the removal of $PO_4^{3-}$ using α-ZrP, while FIG. 3.5 is a table summarizing the removal (uptake) results for EP-113.

By increasing the suspension concentration of α-ZrP (Zr:P ratio=1) preliminary tests indicate an overall decrease in orthophosphate uptake. Even though additional surface area was introduced (i.e., expected increase in removal efficiency) this decrease may have resulted in part from the simultaneous supply of unwanted "residual" $PO_4^{3-}$.

Example 3

Orthophosphate ($PO_4^{3-}$) Removal Using α-ZrP

In this example we compare phosphate uptake (mg/g) of 1, 2 & 4 g/L α-ZrP (EP-142) suspensions in 10 mg/L $PO_4^{3-}$ solution without pH adjustment. Measure stability of 1, 2 & 4 g/L α-ZrP suspensions in DI $H_2O$.

The α-ZrP (Zr:P ratio=1) was prepared by modifying the reflux method according to Sun et al. (2007). Briefly, 2 grams of $ZrOCl_2.8H_2O$ was refluxed with 20 mL 1.0 M $H_3PO_4$ in a pyrex glass flask at 100° C. for 24 hrs. The gel product was then thoroughly washed with DI water and dried at 60° C. for 24 hrs.

Post-treatment was performed by separately re-suspending dried α-ZrP in 0.1 M $ZrOCl_2.8H_2O$. A 24-hr equilibration time was arbitrarily selected with continuous agitation. The post-treated samples were thoroughly washed with DI water to remove excess salt and dried as before. Suspensions (1 g/L) of α-ZrP were equilibrated in DI water and 10 mg/L phosphate solutions for 24 hrs. Aliquots (7 mL each) were then analyzed for phosphate.

For this experiment α-ZrP (Zr:P ratio=1) was tested. Sample mineral in this case refers to EP-142.

FIGS. 4.1 to 4.4 are equilibration graphs in DI water and 10 mg/L $PO_4^{3-}$ illustrating the removal of $PO_4^{3-}$ using α-ZrP, while FIG. 4.5 is a table summarizing the results for EP-142.

EP-113 and EP-142 were identical preparations of α-ZrP. By increasing the suspension concentration of α-ZrP (Zr:P ratio=1) preliminary tests indicate an overall decrease in orthophosphate uptake. Even though additional surface area was introduced (i.e., expected increase in removal efficiency) this decrease may have resulted in part from the simultaneous supply of unwanted "residual" $PO_4^{3-}$.

Example 4

Orthophosphate ($PO_4^{3-}$) Removal Using Zr-MDP & Zr-OBP: In this Example we compare phosphate uptake (mg/g) of 1, 2 & 4 g/L Zr-MDP (EP-144) & Zr-OBP (EP-148) suspensions in 10 mg/L $PO_4^{3-}$ solution without pH adjustment.

The α-ZrP (Zr:P ratio=1) was prepared by modifying the reflux method according to Sun et al. (2007). Briefly, 2 grams of $ZrOCl_2.8H_2O$ was refluxed with 20 mL 1.0 M $H_3PO_4$ in a pyrex glass flask at 100° C. for 24 hrs. The gel product was then thoroughly washed with DI water and dried at 60° C. for 24 hrs.

Post-treatment was performed by separately re-suspending dried α-ZrP in 0.1 M $ZrOCl_2.8H_2O$. An 24-hr equilibration time was arbitrarily selected with continuous agitation. The post-treated samples were thoroughly washed with DI water to remove excess salt and dried as before. Suspensions (1 g/L) of α-ZrP were equilibrated in DI water and 10 mg/L phosphate solutions for 24 hrs. Aliquots (7 mL each) were then analyzed for phosphate.

FIGS. 5.1 to 5.4 are graphs illustrating the removal of $PO_4^{3-}$ from a 10 mg/L $PO_4^{3-}$ using Zr-OBP (EP-148) and Zr-MDP (EP-144), while FIGS. 5.5 and 5.6 is a table summarizing the removal (uptake) results for EP-148 and EP-144, respectively.

Again, by increasing the suspension concentration of α-ZrP (Zr:P ratio=1) preliminary tests indicate an overall decrease in orthophosphate uptake. Even though additional surface area was introduced (i.e., expected increase in removal efficiency) this decrease may have resulted in part from the simultaneous supply of unwanted "residual" $PO_4^{3-}$.

Example 5

TABLE 1

Example 5 - Summary of Results

| Nanoparticle Adsorbent (1 mg/mL suspension) | Phosphate Removal (mg $PO_4^{3-}$/g Nanoparticle) |
|---|---|
| α-ZrP | 2-8 |
| Zr-MDP | 6 |
| Zr-OBP | 5 |

*It should be noted that these are preliminary results, and no controls were place on pH or ionic strength.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measurement technique and the type of numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:

1. A method of removing a contaminant from an aqueous solution, the method comprising:
exposing the aqueous solution to a filter, wherein the aqueous solution includes the contaminant, wherein the filter comprises alpha-zirconium phosphate; and
removing the contaminant when the contaminant in the aqueous solution contacts the alpha-zirconium phosphate in the filter,
wherein the contaminant is $HPO_4^{2-}$.

* * * * *